| United States Patent [19] | [11] Patent Number: 4,860,286 |
|---|---|
| Forsberg et al. | [45] Date of Patent: Aug. 22, 1989 |

[54] ENCODING METHOD IN TRANSMISSION OF PLURALITY OF OVERSAMPLED DATA CHANNELS, AND APPARATUS FOR CARRYING OUT THE METHOD

[75] Inventors: Stefan G. Forsberg, Stockholm; Ragnar S. Erkander, Lidingö, both of Sweden

[73] Assignee: Telefonaktiebolaget L M Ericsson, Stockholm, Sweden

[21] Appl. No.: 157,227

[22] Filed: Feb. 18, 1988

[30] Foreign Application Priority Data

Apr. 7, 1987 [SE] Sweden ............................ 8701458-5

[51] Int. Cl.⁴ .......................... H04J 3/06; H04L 1/08; H04L 25/34
[52] U.S. Cl. ...................................... 370/106; 371/70; 375/19
[58] Field of Search ............... 370/106, 110.1; 375/19; 371/70

[56] References Cited

U.S. PATENT DOCUMENTS

| 4,249,266 | 2/1981 | Nakamori | 455/608 |
| 4,599,723 | 7/1986 | Eck | 371/70 |
| 4,636,029 | 1/1987 | Johansson et al. | 350/96.16 |

FOREIGN PATENT DOCUMENTS 1518893 7/1978 United Kingdom .
1539431 1/1979 United Kingdom .

Primary Examiner—Robert L. Griffin
Assistant Examiner—Wellington Chin
Attorney, Agent, or Firm—Burns, Doane, Swecker & Mathis

[57] ABSTRACT

An encoding method in transmitting a plurality of parallel, independent and asynchronous data channels, each of which after encoding into serial from is to be supplied to an optical transmitter before transmission over a fibre-optic cable. The parallel data channels (D1–D4) are over-sampled, i.e. they are sampled several times per time slot and are time multiplexed in a series of frames (R1,R2,R3, ... ) the channels in one frame (R1) being retained with their true values (D1–D4) and in the successive frame (R2) being given their inverted values ($\overline{D1}$–$\overline{D4}$). In addition there are inserted fixed synchronizing bits (F1,F2) and a bit (T1) which alternates between a logical 0 and a logical 1, depending on whether the true or inverted values of the data channels occur in the frames. A parallel-series converter for carrying out the encoding method is described.

3 Claims, 3 Drawing Sheets

ENCODING METHOD IN TRANSMISSION OF PLURALITY OF OVERSAMPLED DATA CHANNELS, AND APPARATUS FOR CARRYING OUT THE METHOD

TECHNICAL FIELD

The invention relates to an encoding method according to the preamble of claim 1, and apparatus for carrying out the method. More specifically, there is intended an encoding method used in multiplexing a plurality of independent parallel data channels to a serial bit flow. The method can be applied, for example, to a fiber-optic link included in a fiber-optic secure system.

BACKGROUND ART

A multiplexer is used in transmitting data signals over a fiber-optic conductor, e.g. from a computer to a fiber cable and between the fiber cable and the terminals. A plurality of data channels which may be synchronous or asynchronous are transferred via the cable between the user terminals and the computer in both directions. In such a case, the multiplexer shall convert the parallel asynchronous data flow from computer/user to the fiber cable so that a serial data flow is obtained in the cable.

It is known in the art to over-sample and encode the incoming data channels for multiplexing a plurality of incoming asynchronous and parallel data channels to a serial bit flow. Over-sampling, means that the data signals are sensed several times per bit slot with the aid of a high-frequency clock. Jitter is introduced on the data channels due to the data signals and clock not being asynchronous. This jitter can, however, be made optically small by sufficiently great oversampling.

The serial bitflow is encoded after the parallel-series conversion. It is desirable to give the serial bit flow an even d.c. balance i.e. equally as many logical 1's as 0's before electro-optical conversion and transmission over the fiber channel. Sensitive receivers are namely a.c.-circuited. Scrambling or block encoding is carried out for this pupose.

Other problems in transmitting over fiber cables is the obtainment of a strong synchronizing condition, possibility of self-correction and small time delay.

The above-mentioned conventional solution with parallel-series conversion, self-correcting encoding and d.c. balancing will generally be a very expensive solution, particularly since decoding on the receiver side is carried out in a corresponding manner, namely descrambling (or block decoding), self-correction and series-parallel conversion.

An example of a system in the art using a special encoding method in transmission over an optical fiber is given in the U.S. Pat. No. 4,249,266, which does not utilize over-sampled data, however.

DISCLOSURE OF INVENTION

Over-sampled data are used in the known solution mentioned in the introduction for tranmitting data channels over a fiber-optic cable, but neither the synchronization, the self-correcting codes nor the d.c. balancing through scrambling-descrambling is dependent on the over-sampling. This solution will therefore be unnecessarily complicated.

In accordance with the invention an encoding method is proposed which is based on over-sampling of the data channels and utilizing this better than in conventional techniques.

According to the proposed encoding method, the data channels are transmitted in alternate frames with their true valve and in alternate frames with their inverterd value. The result of this is that each bit slot corresponding to a data channel will have the value of a logical 1 just as often as the value of a logical O, i.e. a uniform d.c. balance is obtained. The synchronizing part of the code consists of a part with alternating values, and a part with bits which have fixed values. The encoding method is then characterized as disclosed in the characterizing portion of claim 1.

The object of the encoding method in accordance with the invention is to achieve:

(a) synchronizing of a plurality of independent asynchronous data channels,
(b) simple and reliable decoding by having a strong synchronizing condition,
(c) uniform d.c. balance in the bit flow,
(d) the possibility of self-correction,
(e) transmission with small time delay.

BRIEF DESCRIPTION OF DRAWINGS

The invention will now be described in more detail with reference to the accompanying drawing, on which

BEST MODE FOR CARRYING OUT THE INVENTION

Figure 1:
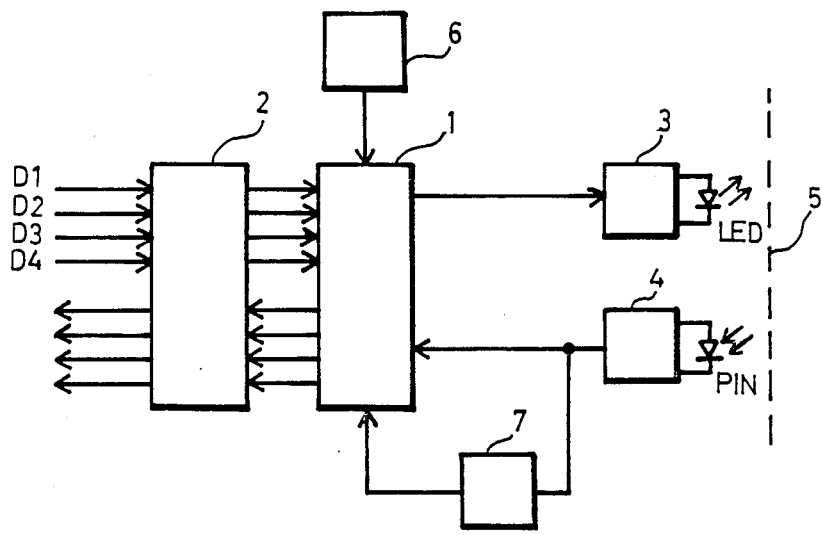
FIG. 1 is a simplified block diagram of the transmitter/receiver side of a fiber-optic data transmission system.

The encoding method according to this invention can be applied on such as the fiber-optic transmitter and receiver system which is included in a fiber-optic secrecy link disclosed in the U.S. Pat. No. 4,636,029. In such a link there is a fiberoptic multiplexer which can transmit a plurality of separate asynchronous or synchronous data channels by the channels being completely independent of each other. In the following it is assumed that synchronous or asynchronous data channels can be transmitted over the fiber link. In a simplified form, FIG. 1 illustrates a transmitter-receiver side including a multiplexer in the form of a gate matrix 1, a signal level adjustment unit 2, an optical transmitter unit 3, an optical receiver unit 4, and an optical interface 5. An oscillator 6 sends highfrequency clock signals to the multiplexer 1. The receiver is assumed to have a time regenerating means 7, e.g. a PLL.

Four data channels from a data source are taken to the adjustment unit 2, and these channels are sent to the multiplexer 1 after signal level adjustment. In the transmission direction, the multiplexer thus receives a plurality of parallel data channels, in this case four, which are to be converterd to a serial bit flow. This bit flow is then supplied to the optical transmitter unit 3, where it is converted to light pulses before transmission over the fiber.

Figure 2:
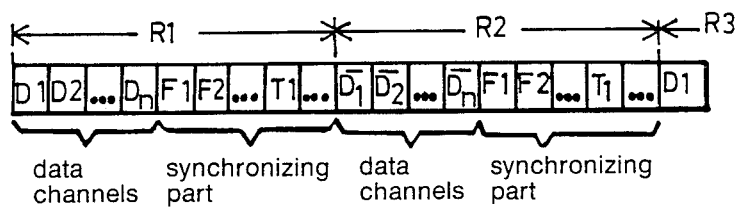
FIG. 2 is a chart of the structure of the encoding method in accordance with the invention.

Turning now to FIG. 2, which illustrates the structure of the code in accordance with the invention, a plurality of independent data channels $D1, \ldots Dn$ are multiplexed together into a serial bit flow by allocating to each data channel a special slot in a conventional manner. A synchronizing part follows after the data channel D1–Dn, this part comprising a plurality of bits F1, F2, . . . with fixed values, and a plurality of bits T1, . . . the value of which alternates as described below. The data channels D1–Dn, the fixed bits F1, F2 . . . and the alternating bits T1, . . . form a frame R1 in a known way. What is novel in the encoding method is, according to FIG. 2, that the data channels D1–Dn following after the frame R1 constitute the inverted value of the data channels D1–Dn. The data channels D1–Dn are associated with a new frame R2. The synchronizing part in the frame R2 comprises, as with frame R1, a plurality of bits F1, F2, . . . with fixed values, which can be the same as the bits F1, F2, . . . in frame R1, and a plurality of bits T1 . . . which alternate and which have a value constituting the inverted value of the bits T1, . . . in frame R1. The data channels D1, . . . , Dn are thus transmitted in alternate frames R1, R3 with their true value and in alternate frames R2, R4 . . . with their inverted value, and the synchronizing part comprises a part which alternates and a part with bits which have fixed values.

The part of the synchronizing part which alternates (one or possibly several bits) changes values between two frames R1, R2. In this way the part which alternates its value contains information as to whether the data channels in a particular frame R1, R2 have been transmitted with their true or inverted values. The alternating part T1 is transmitted, as well as the data channels D1Dn so that the d.c. balance will be uniform. The alternating part preferably comprises a single bit T1 (as illustrated in FIG. 1) and this is the simplest and probably the best way of realizing this part.

The fixed part F1, F2, . . . is needed so that a decoder can find the synchronization and on reception pick out the bits in the serial bit flow on the right data channel. The value of the alternating bit T1 and the transmitted value of the sample for the respective data channel will alternate between a logical 0 and a logical 1 between two frames R1, R2. This does not apply, however, at precisely when the data channel changes value. Fixed bits F1, F2, . . . which normally do not change value between different frames can therefore be easily found by a decoder.

If the fixed part comprises bits in a pair where one has the logical value 1 and the other the logical value 0, a perfect d.c. balance is obtained. A fixed bit is sufficient as fixed part, but then just as many 0s as 1s are not obtained by the encoding. A simple and advantageous method of realizing the fixed part F1, F2 is to use two fixed bits, e.g. F1 = a logical 1 and F2 = logical 0.

Figure 3:
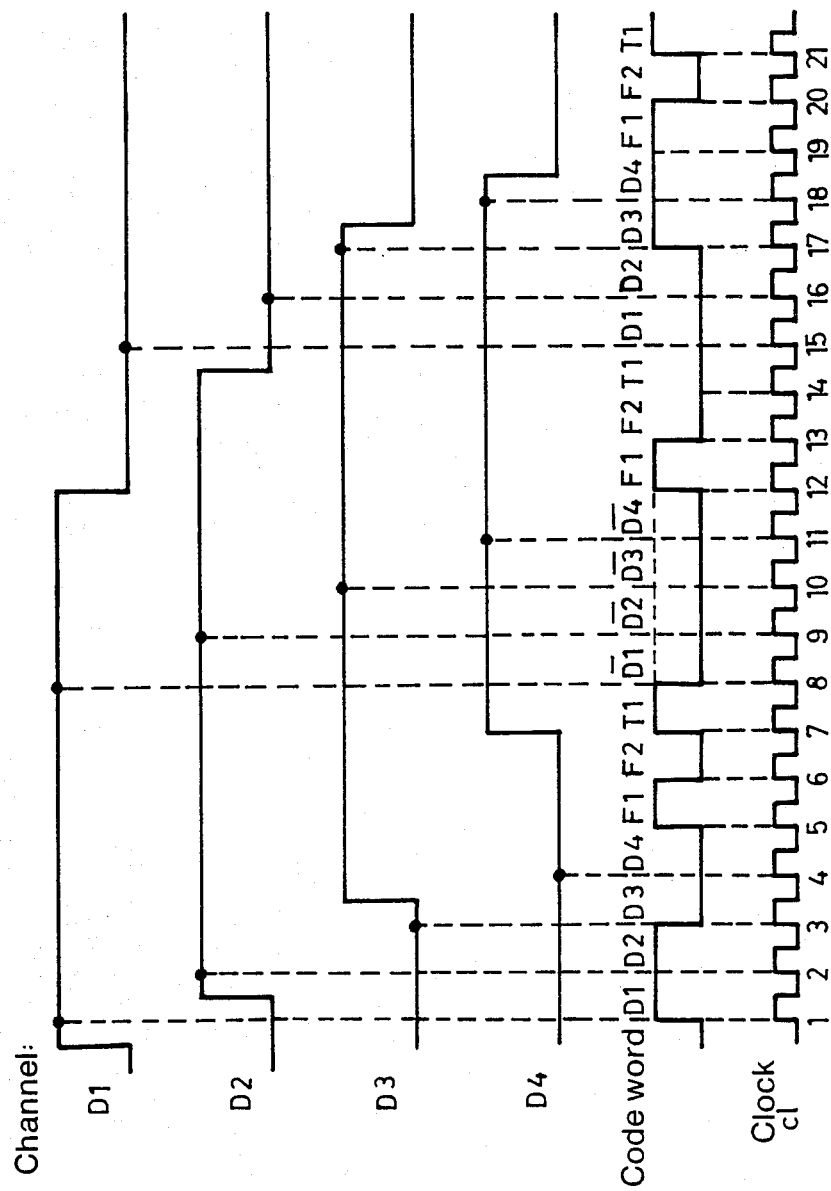
FIG. 3 is a time chart for a plurality of data channels to which the encoding method in accordance with FIG. 1 has been applied.

FIG. 3 illustrates in more detail how the encoding method in accordance with the invention is applied to four different data channels D1–D4, the values of which assume a logical 1 and a logical 0. FIG. 3 shows the four parallel, independent data channels which are to be converted and recoded to a serial bit flow according to FIG. 2. A clock pulse train cl generates a plurality of leading edges 1, 2, 3 . . . each of which sammples the different data channels D1–D4 in time multiplex. The leading edge 1 samples the channel D1 and gives a sample of a logical 1 (true value). The leading edge 2 then samples the data channel D2 which gives ghe sample of a logical 1 (true value). The leading edge 3 gives the sample of a logical 0 (true value) for the channel 3 and the leading edge 4 give the sample of a logical 0 (true value). Both fixed bits F1 and F2 and the alternating bit T1 then follow. F1 and F2 may for example constitute F1 = a logical 1, F2 = a logical 0, and T1 = a logical 1 which states that the data channels D1–D4 have been given with their true values. The frame R1 is thus encoded.

Figure 4:
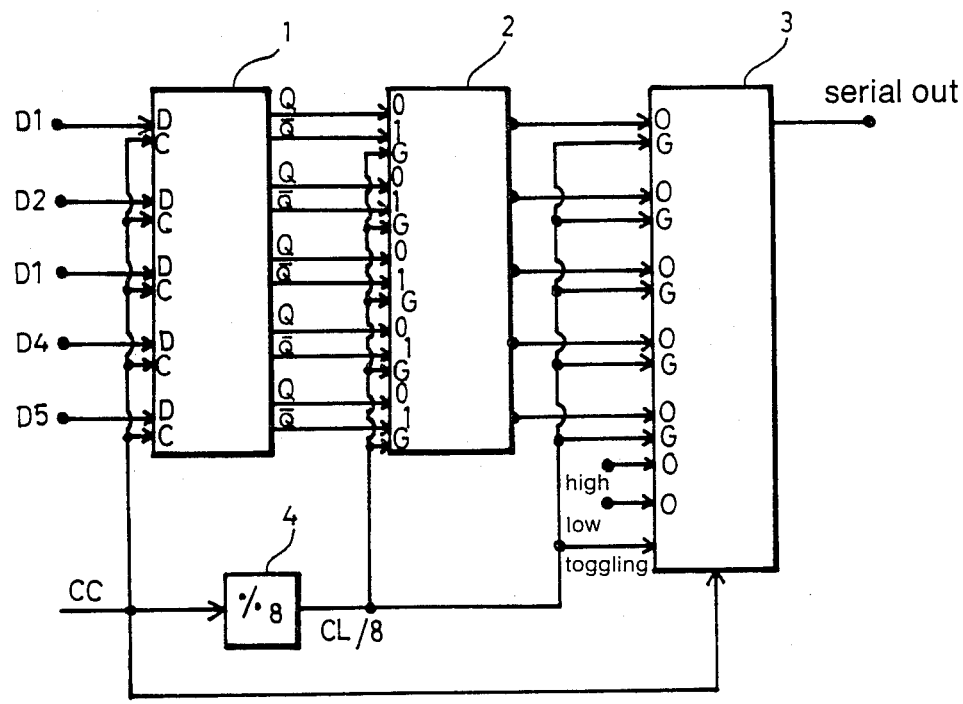
FIG. 4 is a simplified block diagram of a P-S converter for the encoding method in accordance with the invention.

The leading edge 8 once again samples the channel D1 and give the value of a logical 1. This value shall be inserted, since a new frame R2 has been started. The channels D2–D4 are subsequently sampled and inverted in a similar manner as the clock pulse leading edges 9, 10 and 11, both fixed bits F1 and F2 (the leading edges 12 and 13) then following, as well as the alternating bit T1 (leading edge 14), which is now a logical 0, stating that the value of the data channels is inverted. The dashed pulses in the second code word for the channels D1, D2, D3 and D4 give the sampled values a logical 1 before inversion. FIG. 4 is a block diagram for a parallel-series converter which carries out the encoding method in accordance with the invention. An an example there have been selected five data channels D1–D5 and two fixed synchronizing bits F1 = a logical 1 and F2 = a logical 0, and an alternating bit T1. The total number of bits in a frame will thus be eight.

The converter according to FIG. 4 includes three blocks 1, 2 and 3 and a frequency divider 4 which divides down the frequency of the clock signal cl by a factor 8 corresponding to the number of bits in a frame R1, R2.

The block 1 constitutes the synchronizing part which is controlled by the clock signal cl. Sampling and synchronizing of the incoming asynchronous data signals D1–D5 is carried out in the block with a frequency which is much higher than the bit frequency of the data channels. For example, the clock frequency is 2,4576 MHz while the data rate is 19,2 kbits/s. The synchronizing block 1 thus transmits synchronously the true (Q) and inverted ($\overline{Q}$) value of the data channels D1–D5.

Block 2 is the encoding part, which is clocked in time with each frame R1, R2, . . . , i.e. one-eighth of the clock frequency. The block 2 thus encodes the data channels D1–D5 during a time corresponding to one frame, so that across their five outputs the data channels appear with their true value during a given frame R1 and with their inverted value during the subsequent frame R2.

The block 3 is the multiplexer part which converts the values on the data channels obtained in parallel form from the encoding part into serial form. This takes place in time with the clock frequency cl. The block 3 is connected to a high and a low potential forming the two fixed bits F1, F2 in the synchronizing word, and furthermore it is supplied the down-divided clock frequency cl/8 for forming the alternating bit T1. The five data bits with the value Q or $\overline{Q}$, the synchronizing bits F1, F2 and the alternating bit T1 are thus inserted in parallel in the block 3 and can be clocked out in serial form via the output in time with the clock signal cl.

The block 1 comprises a number of D-type multivibrators equal to the number of data channels, i.e. five. Each D-type multivibrator receives and clocks a data channel in time with the incoming high-frequency clock pulses cl, see FIG. 3. Both Q and $\overline{Q}$ outputs on each multivibrator are utilized, since the true and the inverted value of the respective channel shall be formed under alternate frames.

The outputs Q, $\overline{Q}$ from each D-type multivibrator in the block 1 are connected to the block 2, which in this case comprises five so-called MUX-multivibrators. Each such multivibrator has a 0,1-input, the O-input of the first multivibrator being connected to the Q-input of the multivibrator in block 1 and the 1-input is connected to the $\overline{Q}$-output. The next multivibrator in the block 2 is connected by its 0-input to the $\overline{Q}$-output of the corresponding multivibrator in block 1 and with its 1-input to the Q-output of the same multivibrator in the block 1. The 0,1-inputs of the multivibrators in block 2 are thus connected alternatingly to the Q and $\overline{Q}$-outputs of the multivibrators in block 2.

The frequency divider 4 receives the clock pulses cl and down divides these by a factor of 8 (equal to the number of bits in a frame). The down divided clock frequency is supplied to the clock input of the MUX-multivibrators in block 2 so that these send over their outputs non-inverted data bits during one frame and inverted data bis during the next successive frame for each data channel.

The block 3 contains seven MUX-multivibrators, of which five each receives over its 0-input the data bits from the MUX-multivibrators in block 2. Furthermore, the block 4 contains eight D-type multivibrators, of which the Dinputs of the seven uppermost are connected to the outputs of the MUX-multivibrators in block 3. The D-type multivibrators are clocked by the high frequency clock cl and their $\overline{Q}$-output is connected to the 1-input of the MUX-multivibrators in block 3. The MUX-multivibrators in this block are clocked by the downdivided clock frequency cl/8 and their inverting outputs are connected to the D-inputs of the respective D-type multivibrator in the block.

According to FIG. 3, a serial bit flow is obtained from the output of the Dtype multivibrator corresponding to the data channel D1. Both fixed synchronizing bits are obtained by setting the 0-inputs of the sixth and seventh MUX-multivibrator in the block 3 to "high" or "low" which corresponds to F1=a logical logical 1 and F2=a logical O. The input "alt" at which the clock signal cl/8 occurs is connected ot the eighth D-type multivibrator, the inverting input of which is connected to the 1-input of the seventh MUX-multivibrator.

The overall parallel-series conversion is completely synchronous, i.e. all the multivibrators are clocked simultaneously from a single clock cl.

The fixed synchronizing bit F1, F2 can also be used for transmitting data if this data is over-sampled sufficiently often.

If the incoming channels D1–Dn are synchronous with each other and have a uniform d.c. balance they can be transmitted without over-sampling. However, no data can then be transmitted on the fixed synchronizing bits.

We claim:

1. Encoding method for transmitting a plurality (n) of over-sampled data channels (D1–D4) in multiplexing from a corresponding number of parallel channels to a serial bit flow which comprises a series of frames (R1,R2) each of which includes the data channels (D1–D4), the frame interval being less than the time between two succeeding sampling instants, and a synchronizing part (S), the data channels each being allocated a particular time slot in each of said frames, comprising the steps of transmitting the true sampled value of each of said data channels serially in one frame (R1) corresponding to the sampling instant of said true sampled values, transmitting the subsequently sampled value of each of the data channels with their inverted sample value in a subsequent frame (R2) corresponding to the instants of said subsequently sampled values, and transmitting said synchronizing part between the data channels in one frame (R1) and the data channels in the next frame (R2), said synchronizing part having at least one fixed part (F1, F2) and a part (T1) which alternates between the two frames (R1, R2) in response to whether the sampled data channels are transmitted with their true or their inverted values.

2. Encoding method as claimed in claim 1, characterized in that the synchronizing part includes three bits (F1,F2,T1) of which two bits (F1,F2) have a fixed state (1,0) irrespective of which frame is encoded, and a bit (T1) with a state alternating between two successive frames in response to whether the sampled data channels are transmitted with their true or their inverted value.

3. Apparatus for carrying out the method according to claim 1 in transmitting a plurality of oversampled data channels by multiplexing from a corresponding number of parallel channels to a serial bit flow which comprises a series of frames, each of which comprises the data channels and a synchronizing part, each of said data channels being allocated a particular time slot, characterized by a parallel-series converter, containing a synchronizing unit for synchronizing the incoming data channels which are time multiplexed in frames, to a high frequency clock signal, and an encoding unit for transmitting the true sampled value of each of the data channels during a given frame and transmitting the inverted sampled value of the data channels during the subsequent frame, there being a multiplexer unit (3) for converting the values on the data channels obtained from the encoding unit into serial form in time with the clock signal, a plurality of fixed synchronizing bits and at least one alternating bit being inserted in time with each frame to state whether the data channels occur with their true or their inverted sampled value.

* * * * *